United States Patent [19]

Anderson et al.

[11] Patent Number: 5,449,262
[45] Date of Patent: Sep. 12, 1995

[54] INSERTER/EXTRACTOR USED WITH CAROUSEL OF STORAGE BINS

[75] Inventors: Richard A. Anderson; Philip D. Lessard, both of Greene, Me.

[73] Assignee: Diamond Machine Co., Lewiston, Me.

[21] Appl. No.: 249,437

[22] Filed: May 26, 1994

[51] Int. Cl.⁶ ................................................. B65G 1/06
[52] U.S. Cl. .................... 414/280; 414/331; 294/119.1; 294/902
[58] Field of Search ............... 414/266, 267, 268, 269, 414/270, 277, 280, 618, 751, 785, 331; 294/119.1, 902

[56] References Cited

U.S. PATENT DOCUMENTS

| | | | |
|---|---|---|---|
| 3,780,852 | 12/1973 | Weiss et al. | 414/331 X |
| 4,032,184 | 6/1977 | Blair | 294/119.1 X |
| 4,252,358 | 2/1981 | Klebs | 294/119.1 X |
| 4,678,390 | 7/1987 | Bonneton et al. | 414/280 X |
| 4,707,013 | 11/1987 | Vranish et al. | 294/119.1 |
| 4,772,170 | 9/1988 | Oldfield | 294/119.1 X |
| 4,981,409 | 1/1991 | Hirose et al. | 414/280 X |
| 5,028,203 | 7/1991 | Masini | 294/119.1 X |
| 5,139,384 | 8/1992 | Tuttobene | 414/280 X |
| 5,226,782 | 7/1993 | Rigling | 414/280 X |
| 5,242,259 | 9/1993 | Yeakley | 414/280 X |

FOREIGN PATENT DOCUMENTS

| | | | |
|---|---|---|---|
| 31201 | 2/1984 | Japan | 414/280 |
| 262702 | 12/1985 | Japan | 414/280 |
| 1172840 | 8/1985 | U.S.S.R. | 414/331 |

OTHER PUBLICATIONS

Mobot Product Literature, Apr. 12, 1982.
Mobot Gripper drawing.
Diamond Phoenix Product Literature, Oct. 21, 1992.

Primary Examiner—Michael S. Huppert
Assistant Examiner—Stephen Gordon
Attorney, Agent, or Firm—Fish & Richardson

[57] ABSTRACT

An inserter/extractor apparatus for inserting and extracting objects from bins located at different heights in a carousel including a vertical frame and an inserter/extractor carriage that is vertically movable along the frame and has a pair of gripping pads that have opposed, high friction gripping surfaces. The gripping pads are movable along a first horizontal axis from a retracted position in which said gripping pads and carriage are free to move vertically along the frame without interference with the bins to an extended position in which the gripping pads are even with a bin. The gripping pads are movable with respect to each other along a second horizontal axis that is transverse to the first horizontal axis from open positions spaced from each other by a distance larger than the largest dimension of an object to positions spaced from each other by a distance less than the smallest dimension for an object. The gripping pads apply a predetermined force to an object between them when stopped from further movement along the second horizontal axis by the object between them.

3 Claims, 6 Drawing Sheets

INSERTER/EXTRACTOR USED WITH CAROUSEL OF STORAGE BINS

BACKGROUND OF THE INVENTION

The invention relates to inserter/extractor apparatus for inserting and extracting objects from storage bins located at different heights in a carousel.

One type of automatic storage and retrieval system includes a carousel of bins that are arranged in vertical groups and travel in an endless loop around tracks. An inserter/extractor carriage on a vertical frame is vertically moved to a height aligned with a bin, and then a gripper stage of the carriage is moved horizontally into and out of the bin to either insert or extract a tote box. The tote boxes can then be moved to a different height and/or to a conveyor. Typically, the tote boxes have lips that are engaged by finger gripper mechanisms. An engaged tote box slides on the shelf of the bin and on a platform of the inserter/extractor carriage during the insertion/extraction process.

SUMMARY OF THE INVENTION

In one aspect, the invention features, in general, an inserter/extractor apparatus for inserting and extracting objects from bins located at different heights. The apparatus includes a vertical frame that faces the bins and an inserter/extractor carriage that is vertically movable along the frame to positions corresponding with the heights of the bins. The carriage includes a pair of gripping pads that have opposed, high-friction gripping surfaces and are carried by the carriage. The gripping pads are movable along a first horizontal axis into and out of a bin and are movable with respect to each other along a transverse second horizontal axis so as to engage an object between them. The gripping pads apply a predetermined force to the object between them when they are stopped from further movement along the second horizontal axis by the object. The pads provide sufficient force to frictionally engage objects of different dimensions, but the force is controlled so as to not crush the objects between them.

In preferred embodiments, the inserter/extractor carriage includes a first driver (most preferably an electric motor) to move a gripper stage along the first horizontal axis into and out of the bins relative to a carriage stage that travels vertically along the frame. The gripper stage includes a second driver (most preferably a pneumatic cylinder) that moves the gripping pads relative to each other along the second axis. Preferably, the gripping stage includes one or more guide members (e.g., horizontal rods), and the gripping pads are attached to support members that slide along the guide members. The pneumatic cylinder is connected between the support members. In this way, the two gripping pads and pneumatic cylinder are free to slide along the guide rods as a self-aligning unit with respect to objects in the bins, and the pneumatic cylinder provides a predetermined gripping force to the gripping pads. The cylinder has controlled pressure chambers on both sides of the piston to move the gripping pads toward and away from each other.

The gripping pads are preferably resiliently movable with respect to the support members for them. They are capable of vertical movement and some angular movement about a horizontal axis. The gripping pads are connected to the support member by an arrangement of slots, protruding members and springs. The slots are wider than the protruding members. The protruding members can move resiliently with respect to the slots, owing to the springs, and can additionally move angularly, owing to the oversized slots.

In another aspect, the invention features, in general, a carousel for use with the inserter/extractor apparatus. The carousel has tracks that provide an endless loop with an insertion/extraction station at which the bins face the frame. Vertical groups of bins are attached to pairs of vertical support members that are movable along the tracks. Each bin has a back wall, two side walls, and a shelf that extends from the back wall to a location in front of the side walls in cantilever fashion. In this manner, opposed gripping pads can be spaced from each other by a distance that is larger than the width of a bin when they are moved along the first horizontal axis from the frame toward a bin. The gripping pads can then be brought together to engage the object over the extending portion of the shelf.

In preferred embodiments, the back walls for the bins in the same vertical group are provided by a common back wall member, and the side walls for the bins in the same vertical group are provided by common side wall members. The shelves are removably mountable along the back wall member and the side wall members. The shelves are supported by the side wall members and prevented from tipping forward when an object is placed on an extending portion of a shelf owing to portions of the shelf that extend under downward directed surfaces of the back wall member. The shelves also have some portions that extend over upward directed surfaces of the back wall member in order to support the shelves on the back wall member. Preferably, the shelves, back wall members, and side wall members are made of wire grids.

Other advantages and features of the invention will be apparent from the following description of the preferred embodiment thereof and from the claims.

DESCRIPTION OF THE PREFERRED EMBODIMENTS

Figure 1:
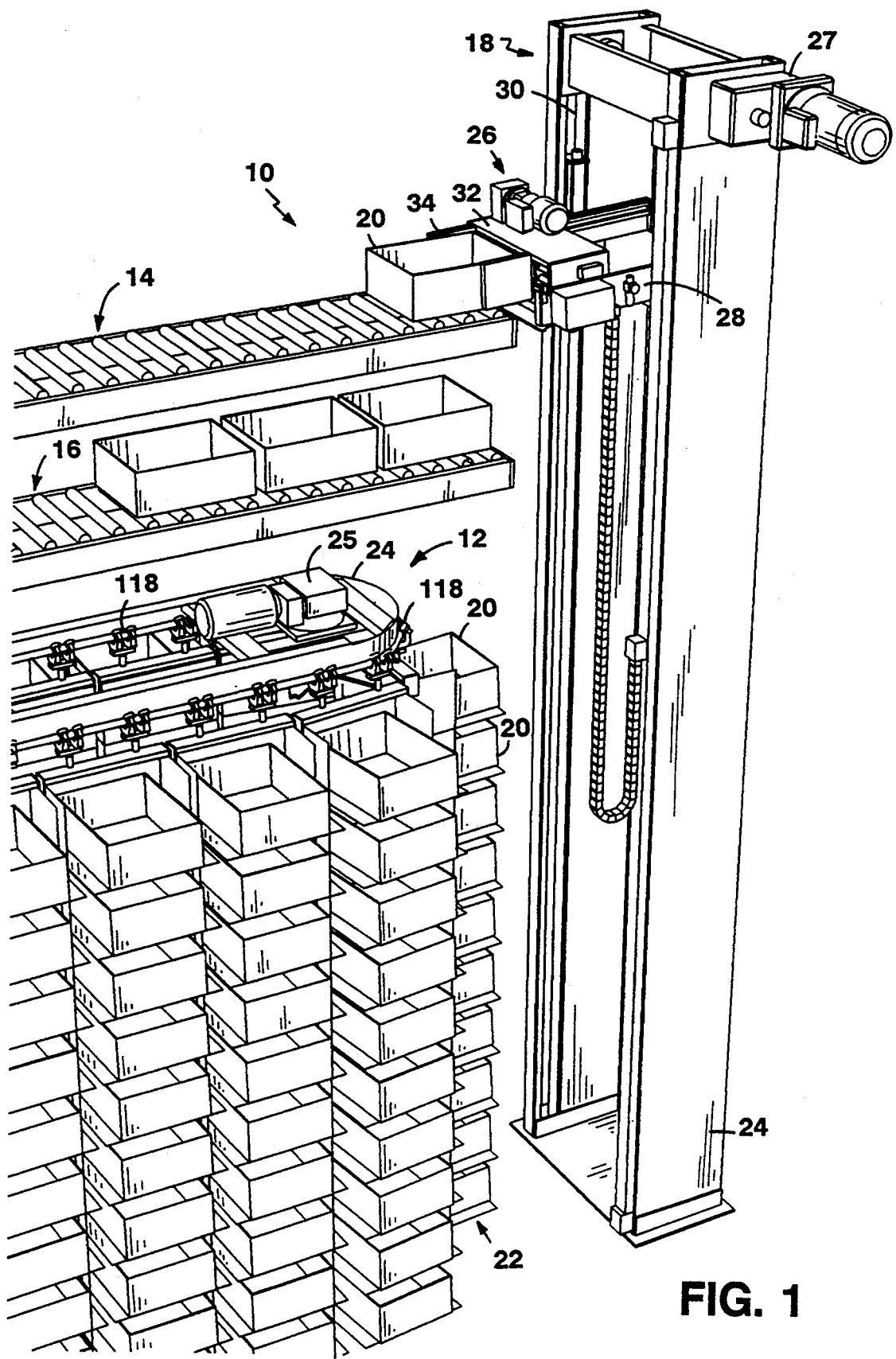
FIG. 1 is a perspective view of inserter/extractor apparatus including a carousel of vertical bins according to the invention.

Referring to FIG. 1, there is shown automatic storage and retrieval system 10, which includes a carousel of bins 12, roller conveyors 14, 16, and inserter/extractor 18 for moving boxes 20 between conveyors 14, 16 and bins of carousel 12. The bins are arranged in vertical groups 22 that are movable along tracks 24 (only the top track is shown in FIG. 1) of carousel 12 by motor 25. Tracks 24 provide an endless loop; only the end of the loop adjacent inserter/extractor 18 is shown in FIG. 1. This location on the loop is an insertion/extraction station of the carousel.

Inserter/extractor 18 includes vertical frame 24 that faces the bins and extends vertically along the entire carousel and additionally extends upward to vertical positions even with the ends of roller conveyors 14, 16.

Inserter/extractor carriage 26 is vertically movable along frame 24 and is driven by motor 27 and a sprocket and chain drive system (not shown). Inserter/extractor carriage 26 includes carriage stage 28, which is vertically movable along opposed recessed tracks 30 within frame 24. Inserter/extractor carriage 26 also includes gripper stage 32 that moves horizontally with respect to carriage stage 28 along a first horizontal axis extending from frame 18 to the insertion/extraction station at the end of carousel 12. Gripping members 34 are movable horizontally with respect to each other on gripper stage 32 along a second horizontal axis that is perpendicular to the first axis so as to engage boxes 20 between them.

Figure 2:
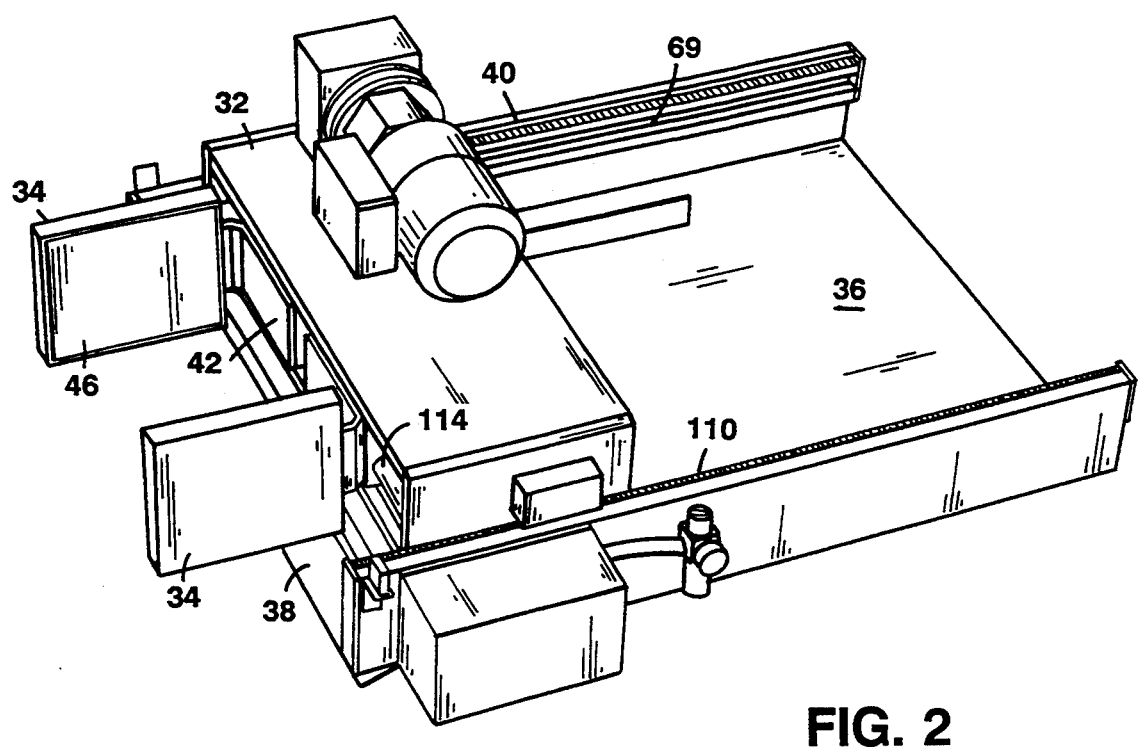
FIG. 2 is a perspective view of a carriage stage and a gripper stage of an inserter/extractor carriage of the FIG. 1 apparatus.

Referring to FIG. 2, carriage stage 28 includes flat platform 36 and slightly inclined ramp 38 leading thereto. Boxes 20 slide over and are supported by platform 36. Carriage stage 28 includes racks 40 along two sides thereof; racks 40 have teeth that mate with the teeth of drive pinions of gripper stage 32.

Figure 3:
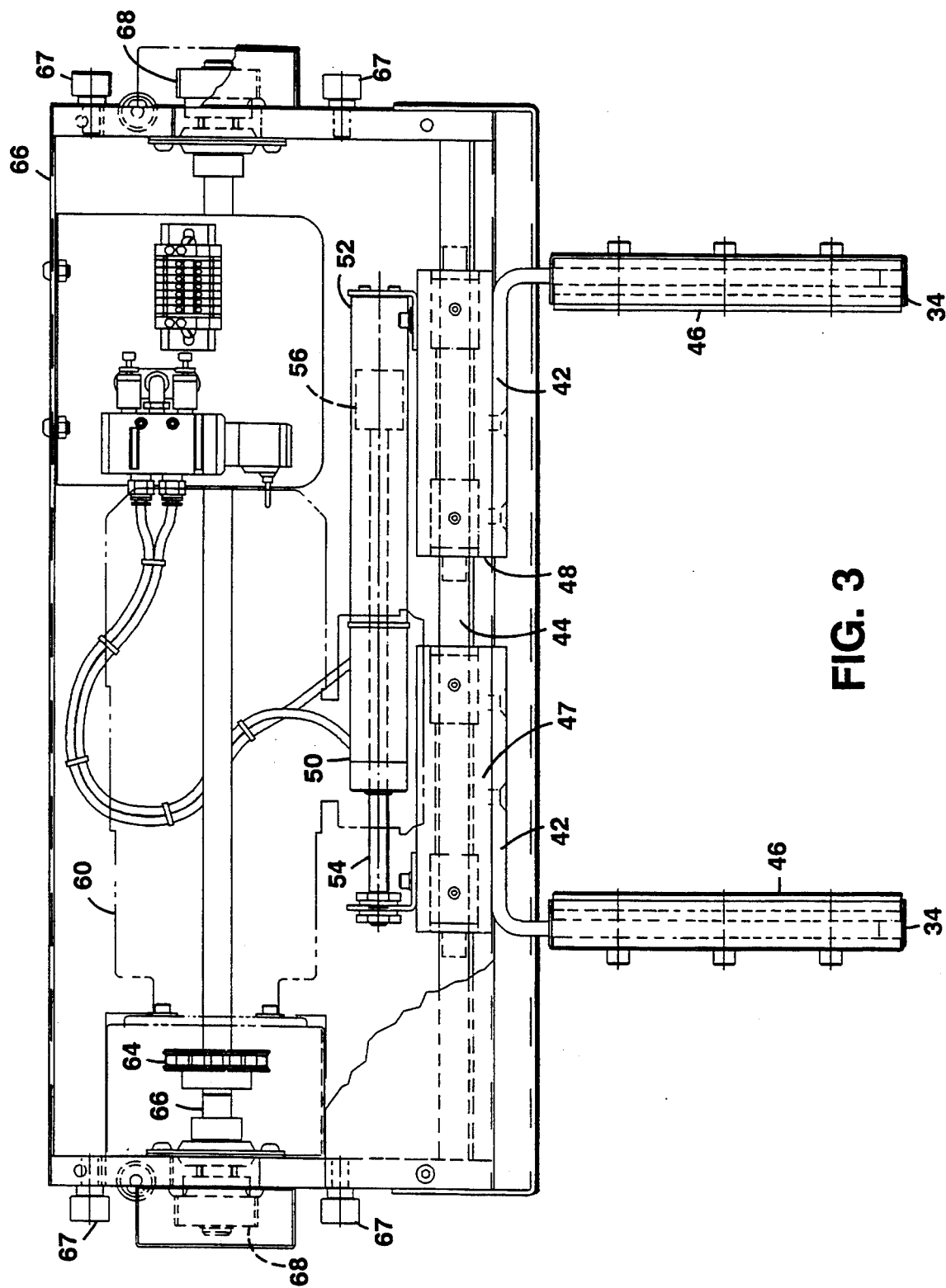
FIGS. 3, 4, and 5 are a top plan view, a front elevation, and a side elevation of the FIG. 2 gripper stage.
Figure 5:
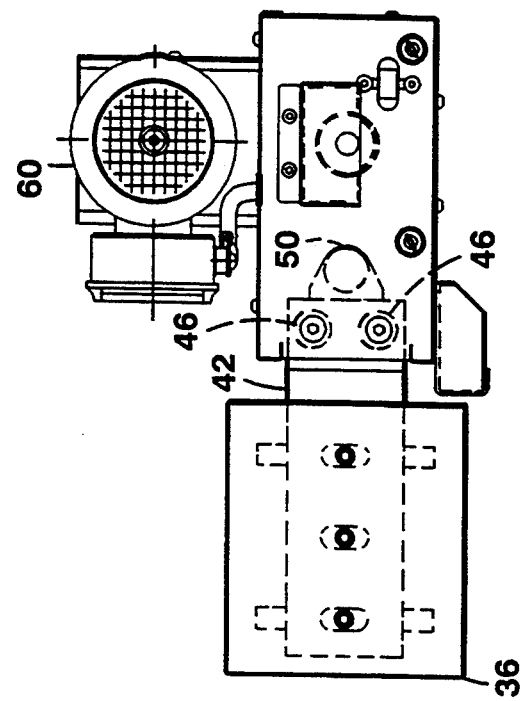
Figure 4:
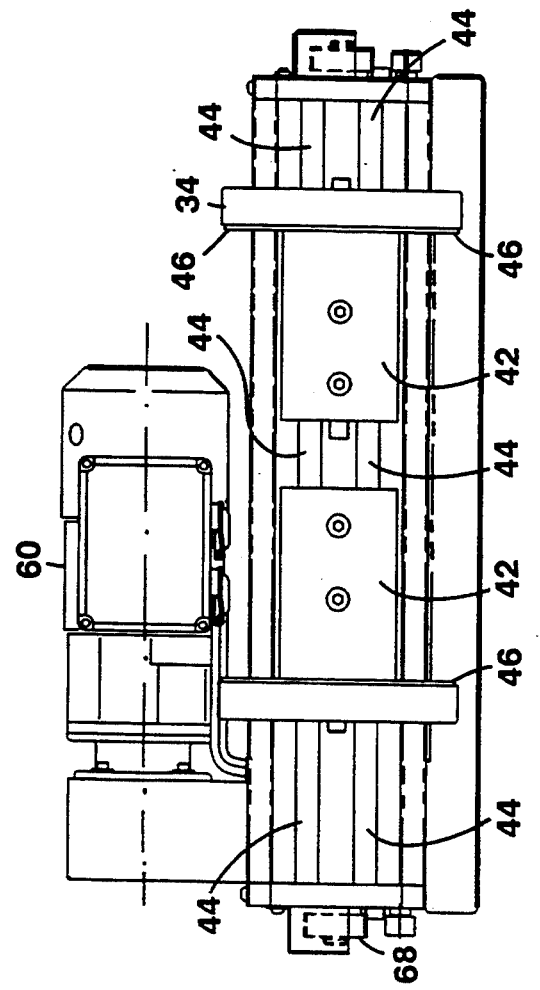

Referring to FIGS. 3–5, gripper members 34 include connected support members 42 that slide along two, horizontal guide rods 44 of gripper stage 32. Gripper members 34 have gripping pads 46 (made of a sheet of rubber having high friction nubs of the type used in conveyor belts) for providing a high coefficient of friction with objects engaged between opposed gripping pads 46. Support members 42 are each connected to a respective slide block 47 or 48 that each has ball bearings therein for low friction sliding along guide rods 44. Pneumatic cylinder 50 is connected between slide block 47 and slide block 48 to provide relative movement of the two along guide rods 44. Cylinder casing 52 of pneumatic cylinder 50 is connected to slide block 48, and rod 54 of pneumatic cylinder 50 is connected to slide block 47. Rod 54 is connected to piston 56 inside cylinder casing 52. There are two pressure chambers within cylindrical casing 52, one on each side of piston 56. The pressure chambers are connected to adjustable pressure sources. Electric motor 60 (shown in phantom in FIG. 3) is connected via sprocket 62, chain 64, and shaft 66 to pinions 68 that have teeth engaging the teeth of racks 40. Gripper stage 32 also has guide bearings 67 that travel in tracks 69 (FIG. 2) on carriage stage 28.

Figure 6:
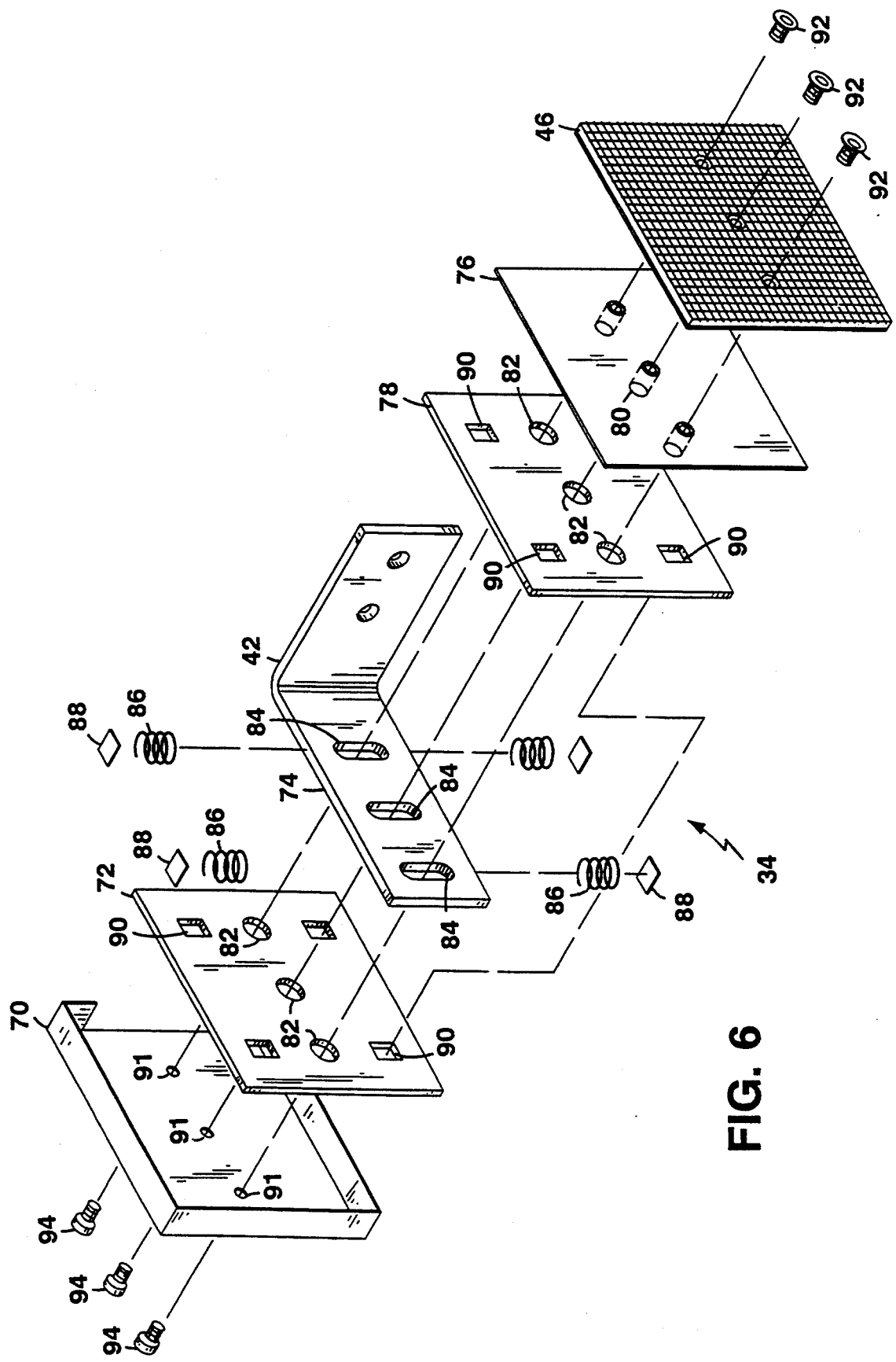
FIG. 6 is an exploded perspective view of a gripping member of the FIG. 2 gripper stage.

Referring to FIG. 6, gripping members 34 include outside cover 70 and wear pad 72 on one side of bar 74 of support member 42 and gripping pad 46, inside plate 76 and wear pad 78 on the other side. Cylindrical protruding members 80 extend from the rear surface of inside plate 76, pass through circular holes 82 in wear pads 72, 78 and elongated slots 84 in bar 74, and butt up against the inside surface of outside cover 70 around respective holes 91. Three threaded connectors 92 on one side and three threaded connectors 94 on the other are aligned with cylindrical protruding members 80 and hold the assembly of gripping member 34 together. When assembled, spring end tabs 88 span between aligned rectangular holes 90 in the spaced apart wear pads 72, 78 and are biased by springs 86, the outer portions of which are also located in rectangular holes 90. The central portions of springs 86 contact the upper or lower surfaces of bar 74. Protruding members 80 are smaller in diameter than the width of slots 84, permitting some angular movement between gripping pad 46 and support member 42.

Figure 7:
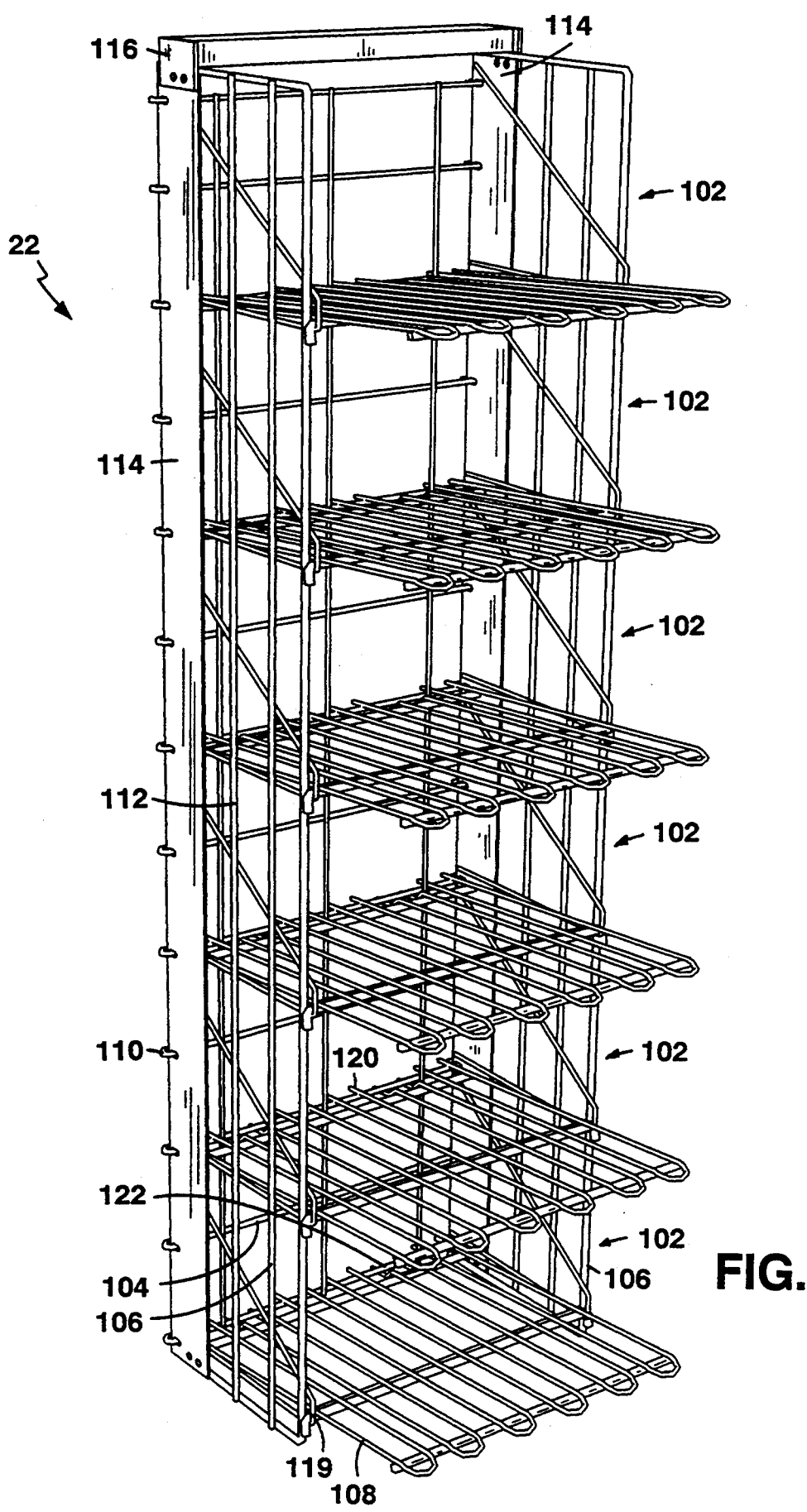
FIG. 7 is a perspective view of a vertical group of bins of the FIG. 1 carousel.

Referring to FIG. 7, vertical group 22 of bins 102 is shown. Group 22 has six bins 102 at different heights along a common vertical axis. Each bin has a back wall 104, two side walls 106, and a shelf 108 that extends from back wall 104 to a location in front of side walls 106 in cantilever fashion. The back walls 104 for the group 22 of bins 102 have common back wall member 110 that extends along the height of group 22. Side walls 106 are also formed of common side wall members 112 that extend along the height of group 22. Back wall member 110 and side wall members 112 are connected to vertical support members 114, which are connected at the top to bar 116. Rollers 118 (FIG. 1) that travel along tracks 24 are connected to bar 116. Back wall member 110, side wall member 112, and shelves 108 are made of wire grids. The horizontal wire components of the wire grid of back wall members 110 are secured to vertical support members 114. The horizontal and angled wire components of side wall members 112 are similarly connected to vertical support members 114.

Shelves 108 have transverse horizontal wire 119 supported by a horizontal wire member of side wall members 112. At the rear of shelves 108, there are some wire portions 120 that extend over horizontal wires of back wall member 110 and some wire portions 122 that extend under the horizontal wires of back wall member 110. Wire portions 120 provide support of shelf 108 on back wall member 110, and wire portions 122 prevent forward rotation of shelf 108 when a box 22 is on the front, cantilevered portion of shelf 108 that extends beyond side walls 106.

OPERATION

In operation, cardboard boxes 20 are supplied to and transported away from storage carousel 12 via roller conveyors 14, 16. Inserter/extractor 18 transports boxes 20 to, from, or between bins on storage carousel 12. Motor 25 of carousel 12 automatically advances the vertical groups of bins 22 around tracks 24 until the desired group 22 is at the insertion/extraction station facing frame 24. When transferring a box 20 from a conveyor 14 or 16 to carousel 12, carriage stage 28 is first moved vertically along frame 24 so that gripper members 34 are even with the box 20 on the conveyor 14 or 16. Gripper stage 32 is then advanced along the first horizontal axis by motor 60 with gripper members 34 in an opened position in which they are spaced from each other by a distance that is larger than the largest box dimension. Gripper stage 26 is advanced until gripper pads 34 are aligned with the end of box 20. Pads 34 are then brought together by pneumatic cylinder 50. When gripping pads 46 engage box 20, they are prevented from moving closer together by box 20, and the force applied by them to the box is controlled by the pressure that has been applied by pneumatic cylinder 50, thereby preventing crushing of box 20. Depending on the type of boxes expected, the pressure is adjusted ahead of time to a setting that guarantees good gripping without crushing. At the same time, pneumatic cylinder 50 provides sufficient force to frictionally engage box 20 and slide box 20 over platform 36 as gripper stage 32 is retracted back over carriage stage 28 within frame 24. Box 20 now is entirely over platform 36, and inserter/extractor carriage 26 is free to move vertically without hitting the ends of conveyors 14, 16 or shelves 108 of bin group 22. Inserter/extractor carriage 26 is moved vertically until the engaged box 20 is aligned with the desired bin 102 at the insertion/extraction station. Gripper stage 32 is then advanced along the first axis, and box 20 slides over the respective shelf 108 and into the respective bin 102. Pneumatic cylinder 50 is engaged to move gripper members 34 away from each other during the insertion procedure so that the flat surfaces of support members 42 push box 20 in a properly aligned position. (This corrects for possible misalignment that might have occurred when extracting a box 20.) Because shelves 108 extend beyond side walls 106, the gripping members 34 are free to move to and from the bins when in a widely spaced configuration without hitting side wall members 106.

Gripper stage 32 is then retracted to a position over platform 36 via operation of motor 60, and inserter/extractor carriage 26 is free to move vertically to pick up another box 20 at conveyor 14 or 16 or at another bin 102. When extracting a box 20 from a bin 102, the gripper stage 32 is advanced by motor 60 until the gripper members 34 are aligned with the exposed end of box 20 extending from side walls 106, and the box 20 is engaged and extracted by retracting gripper stage 32.

When a box 20 is being engaged, as gripper members 34 are brought toward each other, if one member 34 contacts box 20 before the other (e.g., owing to misalignment), it generally stops, and the other gripper member 34 moves relative to the stopped gripping member 34 owing to the freely slidably mounted arrangement of the two gripper members 34 and the pneumatic cylinder between them on horizontal guide rods 44. In this manner, gripping members 34 are self-aligning in a horizontal direction.

Gripping pads 46 are resiliently mounted with respect to support members 42 owing to a spring and slot configuration. They can thus move vertically and have slight angular rotation during engagement and/or extraction of box 20 to accommodate differences between the elevation of platform 36 and the elevation of shelf 108 or conveyors 14, 16 without requiring lifting of box 20 or relative movement between box 20 and gripping pads 46. Ramp 38 directs boxes when necessary if there is a difference in elevation between platform 36 and the shelf of a bin.

Other embodiments of the invention are within the scope of the appended claims. For example, the inserter/extractor carriage could be used with other types of vertical bin storage systems besides the carousel system described. Also, the gripper stage could be raised above (or situated below) platform 36 with gripping members 34 extending downward (or upward) to provide a pass-through configuration in which the boxes pass through the frame to a conveyor located at the other side of the frame from the carousel.

What is claimed is:

1. An inserter/extractor apparatus for inserting and extracting objects from bins located at different heights comprising
   a frame that faces said bins and extends vertically along said heights, and
   an inserter/extractor carriage that is vertically movable along said frame to positions corresponding to said heights, said carriage including
      a pair of gripping pads that have opposed, high friction gripping surfaces and are carried by said carriage,
   said gripping pads being movable along a first horizontal axis from a retracted position in which said gripping pads and carriage are free to move vertically along said frame without interference with said bins to an extended position in which said gripping pads are even with a said bin,
   said gripping pads being movable with respect to each other along a second horizontal axis that is transverse to said first horizontal axis from open positions spaced from each other by a distance larger than the largest dimension of a said object to positions spaced from each other by a distance less than the smallest dimension for a said object, said gripping pads applying a predetermined force to a said object between them when said gripping pads are stopped from further movement along said second horizontal axis by said object between them,
   wherein said carriage further comprises a first driver to drive said gripping pads along said first horizontal axis,
   wherein said carriage includes a carriage stage that is vertically movable along said frame and a gripper stage that carries said gripping pad and is movable along said first axis with respect to said carriage stage, said gripper stage being driven by said first driver,
   wherein said gripper stage includes a guide member that extends along said second axis, said gripping pads being movable along said guide member by a second driver, and
   wherein said second driver is connected between said gripping pads to move said gripping pads with respect to each other, said gripping pads and connected second driver being free to move along said guide member as a self-aligning unit.

2. The apparatus of claim 1 wherein said second driver comprises a pneumatic cylinder having a cylinder casing connected to one said gripping pad, a piston within said casing, and a rod connected between said piston and the other said gripping pad.

3. The apparatus of claim 2 wherein said cylinder has pressure controlled chambers on both sides of said piston.

* * * * *